US012800955B2

(12) United States Patent
Kunai et al.

(10) Patent No.: US 12,800,955 B2
(45) Date of Patent: Nov. 17, 2026

(54) SPATIAL OPTICAL PHASE MODULATOR AND OPTICAL COMPUTING DEVICE

(71) Applicant: FUJIKURA LTD., Tokyo (JP)

(72) Inventors: Yuichiro Kunai, Tokyo (JP); Masahiro Kashiwagi, Tokyo (JP)

(73) Assignee: FUJIKURA LTD., Tokyo (JP)

( * ) Notice: Subject to any disclaimer, the term of this patent is extended or adjusted under 35 U.S.C. 154(b) by 205 days.

(21) Appl. No.: 18/836,163

(22) PCT Filed: Feb. 1, 2023

(86) PCT No.: PCT/JP2023/003204
§ 371 (c)(1),
(2) Date: Aug. 6, 2024

(87) PCT Pub. No.: WO2023/153286
PCT Pub. Date: Aug. 17, 2023

(65) Prior Publication Data

US 2026/0177848 A1 Jun. 25, 2026

(30) Foreign Application Priority Data

Feb. 8, 2022 (JP) ................................ 2022-018112

(51) Int. Cl.
*G02F 1/09* (2006.01)
*G06E 1/00* (2006.01)

(52) U.S. Cl.
CPC ................ *G02F 1/09* (2013.01); *G06E 1/00* (2013.01); *G02F 2201/16* (2013.01); *G02F 2203/50* (2013.01)

(58) Field of Classification Search
CPC .... G02F 1/09; G02F 2201/16; G02F 2203/50; G06E 1/00
See application file for complete search history.

(56) References Cited

U.S. PATENT DOCUMENTS 5,267,183 A 11/1993 Guilfoyle et al.
8,154,957 B1 * 4/2012 Katsnelson .............. G11B 5/74 369/13.01
2021/0263358 A1 8/2021 Fells et al.

FOREIGN PATENT DOCUMENTS

JP 2007-510174 A 4/2007
JP 2010507826 A 3/2010
(Continued)

OTHER PUBLICATIONS

Written Opinion issued in corresponding International Application No. PCT/JP2023/003204, mailed Apr. 11, 2023, with translation (8 pages).
(Continued)

*Primary Examiner* — Mariam Qureshi
(74) *Attorney, Agent, or Firm* — Osha Bergman Watanabe & Burton LLP

(57) ABSTRACT

A spatial optical phase modulator includes microcells each of which is constituted by an optical phase modulator. Each of the microcells includes a magnetization free layer having a first optically effective surface and a second optically effective surface opposite to the first optically effective surface and conductor that controls a direction of magnetization of the magnetization free layer to be parallel or substantially parallel to normal directions of the first optically effective surface and the second optically effective surface.

6 Claims, 6 Drawing Sheets

(56) References Cited

FOREIGN PATENT DOCUMENTS

| | | | | | |
|---|---|---|---|---|---|
| JP | 2010-282103 | A | | 12/2010 | |
| JP | 5054640 | B2 | | 10/2012 | |
| JP | 2013218142 | A | * | 10/2013 | ............. H01H 13/83 |
| JP | 2017-198949 | A | | 11/2017 | |

OTHER PUBLICATIONS

International Search Report issued in corresponding International Application No. PCT/JP2023/003204, mailed Apr. 11, 2023 (3 pages).

R. Sobolewski et al., "Magneto-Optical Modulator for Superconducting Digital Output Interface," IEEEE Transactions on Applied Superconductivity, Mar. 2001, vol. 11, No. 1, pp. 727-730 (4 pages).

* cited by examiner

SPATIAL OPTICAL PHASE MODULATOR AND OPTICAL COMPUTING DEVICE

BACKGROUND

Technical Field

The present invention relates to a spatial optical phase modulator and an optical computing device including a plurality of spatial optical phase modulators.

Discussion of the Background

A spatial light modulator is obtained by arranging a plurality of optical modulators in a matrix. As the spatial light modulator, a liquid crystal on silicon (LCOS, see, for example, Patent Literature 1) and a digital mirror device (DMD, see, for example, Patent Literature 2) are known. These spatial light modulators are used in, for example, projectors.

PATENT LITERATURE

Patent Literature 1: JP Patent Publication No. 2017-198949
Patent Literature 2: JP Patent Publication No. 2007-510174

With these spatial light modulators, it is difficult to reduce a pixel size.

In addition, it is difficult to operate an LCOS and a DMD at high speed. This is because a liquid crystal is used in an LCOS and a mirror is mechanically moved in a DMD.

SUMMARY

One or more embodiments provide a spatial optical phase modulator capable of being made compact and operating at high speed. One or more embodiments also provide an optical computing device that includes a plurality of spatial optical phase modulators each of which is such a spatial optical phase modulator.

A spatial optical phase modulator in accordance with one or more embodiments is a spatial optical phase modulator including a plurality of microcells. In the present spatial optical phase modulator, each of the plurality of microcells is constituted by an optical phase modulator including: a magnetization free layer having a first optically effective surface and a second optically effective surface that face each other; and a control part (conductor) configured to control a direction of magnetization of the magnetization free layer, and the magnetization free layer and the control part are configured to control the direction of the magnetization such that the direction of the magnetization is parallel or substantially parallel to normal directions of the first optically effective surface and the second optically effective surface.

With one or more embodiments, it is possible to provide a spatial optical phase modulator capable of being made compact and operating at high speed and an optical computing device that includes a plurality of spatial optical phase modulators each of which is such a spatial optical phase modulator.

DESCRIPTION OF THE EMBODIMENTS

Figure 1:
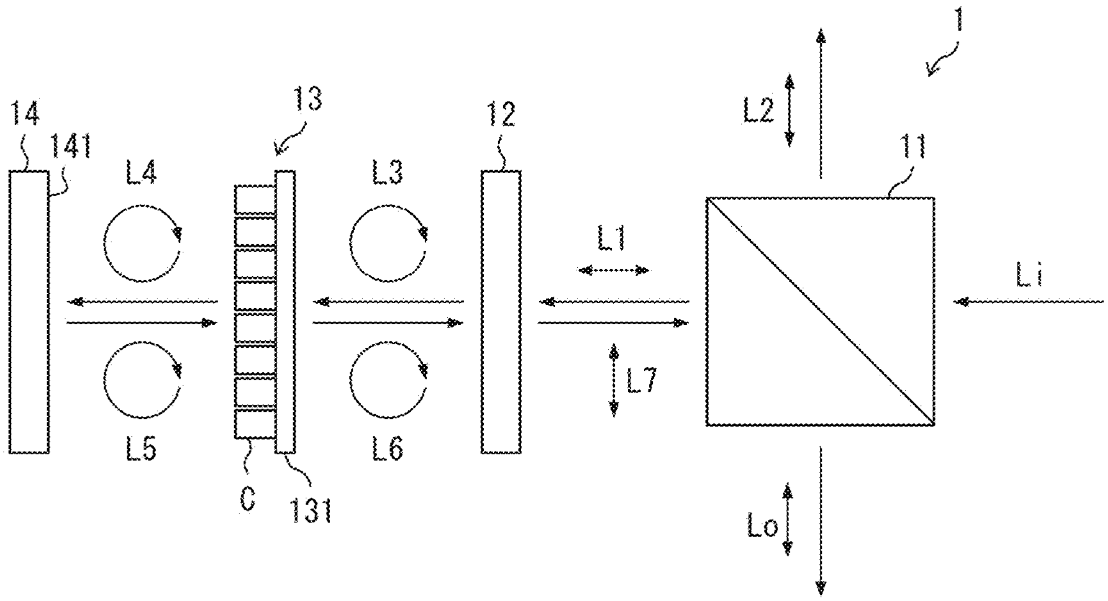
FIG. 1 is a view schematically illustrating a configuration of an optical computing device in accordance with one or more embodiments.
Figure 2:
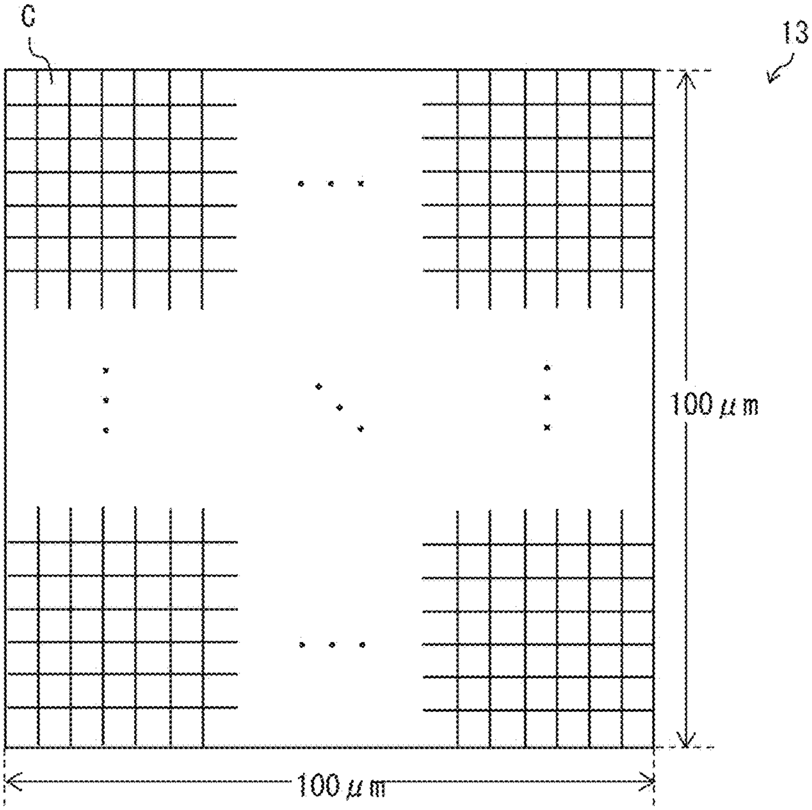
FIG. 2 shows a plan view illustrating a specific example of a spatial optical phase modulator included in the optical computing device illustrated in FIG. 1 and a cross-sectional view illustrating a microcell included in the spatial optical phase modulator.
Figure 2:
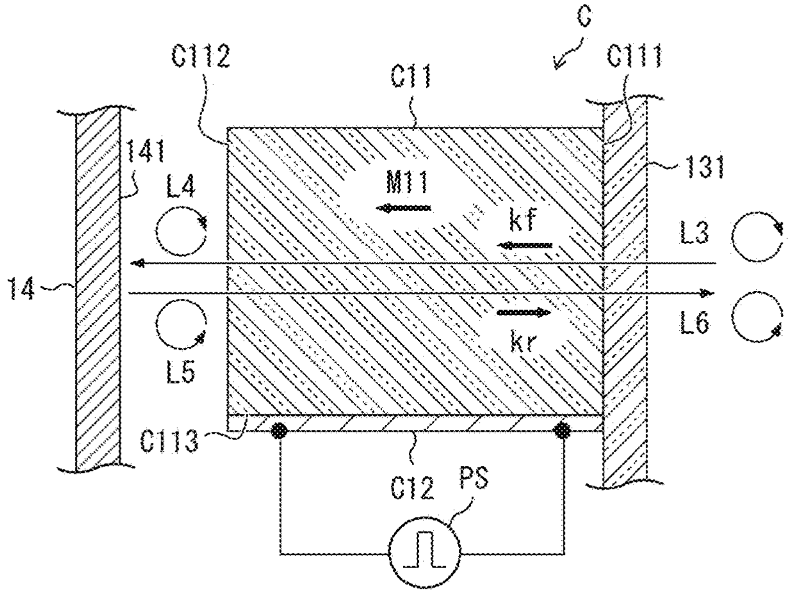

With reference to FIG. 1 and FIG. 2, the following description will discuss an optical computing device 1 in accordance with one or more embodiments. FIG. 1 is a perspective view illustrating a configuration of the optical computing device 1. (a) of FIG. 2 is a plan view illustrating a specific example of a spatial optical phase modulator 13 included in the optical computing device 1. (b) of FIG. 2 is a cross-sectional view of a microcell C included in the spatial optical phase modulator 13.

Configuration of Optical Computing Device

As illustrated in FIG. 1, the optical computing device 1 includes a polarization beam splitter 11, a quarter wave plate 12, a spatial optical phase modulator 13, and a mirror 14.

<Polarization Beam Splitter>

The polarization beam splitter 11 is a polarization separation element that can split incoming light into a p-polarized light component and an s-polarized light component. As the polarization beam splitter 11, one or more embodiments employ a polarization separation element of a type that includes two right-angle glass prisms between which a polarization separation film is sandwiched. Note, however, that the type of the polarization separation element used as the polarization beam splitter 11 is not limited to this, and, for example, the one of a flat-plate type may be employed.

In one or more embodiments, the polarization separation film included in the polarization beam splitter 11 transmits p-polarized light L1, which is a p-polarized light component and reflects s-polarized light L2, which is an s-polarized light component, among incoming light Li. In a state illustrated in FIG. 1, the signal light Li enters the polarization beam splitter 11 from a right side thereof. The polarization beam splitter 11 splits the signal light Li into the p-polarized light L1 and the s-polarized light L2. The polarization beam splitter 11 allows the p-polarized light L1 to pass therethrough toward a left side of the polarization beam splitter 11 and reflects the s-polarized light L2 toward an upper side of the polarization beam splitter 11. Note that the signal light Li has a two-dimensional intensity distribution.

In addition, s-polarized light L7 enters the polarization beam splitter 11 from a left side thereof, as described later. The polarization beam splitter 11 reflects the s-polarized light L7 toward a lower side of the polarization beam splitter 11 to output signal light Lo to an outside of the polarization beam splitter 11.

FIG. 1 schematically illustrates, as arrows, polarization directions of right circularly polarized light L3, right circularly polarized light L4, left circularly polarized light L5, and left circularly polarized light L6 which are described later, in addition to the polarization directions of the p-polarized light L1 and the s-polarized light L2. The arrows indicating these polarization directions each indicate a polarization direction of each of the polarized light beams as viewed from a rear side of the propagation direction of the polarized light beam. As compared between the right circularly polarized light L3 and L4 and the left circularly polarized light L5 and L6, they apparently rotate in the same direction (in a clockwise direction in a state illustrated in FIG. 1). However, a propagation direction of the right circularly polarized light L3 and L4 and a propagation direction of the left circularly polarized light L5 and L6 are opposite to each other, and thus the polarization directions thereof are opposite to each other.

<Quarter Wave Plate>

The quarter wave plate 12 is an optical element that has a fast axis and a slow axis which are orthogonal to each other and that generates a phase difference of one-fourth of a wavelength between linearly polarized light passing along the fast axis and linearly polarized light passing along the slow axis.

The quarter wave plate 12 is arranged such that one main surface thereof (the main surface located on a right side in a state illustrated in FIG. 1) faces and is parallel to one side surface of the polarization beam splitter 11 (the side surface located on a left side in a state illustrated in FIG. 1). That is, the quarter wave plate 12 is provided on a magnetization free layer C11 side of each microcell C. In addition, the quarter wave plate 12 is provided such that the main surfaces thereof are parallel or substantially parallel to a bottom surface C111 of each microcell C described later.

In addition, the quarter wave plate 12 is arranged such that an angle between the slow axis and the polarization direction of the p-polarized light L1 is 45°. This configuration makes it possible for the quarter wave plate 12 to convert linearly polarized light and circularly polarized light into each other. Therefore, the quarter wave plate 12 converts the p-polarized light L1 into the right circularly polarized light L3 and converts the left circularly polarized light L6 into the s-polarized light L7.

<Half Wave Plate>

Although not illustrated in the optical computing device 1 in FIG. 1, a half wave plate may be provided between the polarization beam splitter 11 and the quarter wave plate 12 and on light paths of the p-polarized light L1 and the s-polarized light L7. In this case, the half wave plate is arranged such that (1) one main surface thereof faces and is parallel to the one side surface of the polarization beam splitter 11 and (2) the other main surface thereof faces and is parallel to one main surface of the quarter wave plate 12. This configuration is widely used as a configuration of a large-bandwidth circularly polarizing plate. Examples of such a large-bandwidth circularly polarizing plate include a configuration in which the half wave plate is arranged such that an angle between a slow axis thereof and the polarization direction of the p-polarized light L1 is 15°, and the quarter wave plate 12 is arranged such that an angle between the slow axis thereof and the polarization direction of the p-polarized light L1 is 75°.

Applying the configuration of the large-bandwidth circularly polarizing plate to the optical computing device 1 as described above can broaden a wavelength bandwidth of light which allows linearly polarized light and circularly polarized light to be converted into each other.

<Spatial Optical Phase Modulator>

The spatial optical phase modulator 13 includes a substrate 131 and a plurality of microcells C arranged two-dimensionally (that is, arranged in a matrix) on one main surface of the substrate 131. The microcells C are configured to have phase-modulation amounts that are able to be set independently of each other. Note that a specific example of the spatial optical phase modulator 13 including the microcells C will be described later with reference to FIG. 2.

The spatial optical phase modulator 13 is arranged such that the other main surface of the substrate 131 faces and is parallel to the other main surface of the quarter wave plate 12 (the main surface located on a left side in a state illustrated in FIG. 1). Therefore, the right circularly polarized light L3 resulting from conversion by the quarter wave plate 12 passes through the spatial optical phase modulator 13 to be converted into the right circularly polarized light L4 which is in turn emitted to a reflection surface 141 of the mirror 14 described later. The left circularly polarized light L5 generated through reflection of the right circularly polarized light L4 on the reflection surface 141 passes through the spatial optical phase modulator 13 to be converted into left circularly polarized light L6 which is in turn emitted to the other main surface of the quarter wave plate 12.

Although described later in detail with reference to FIG. 2, when the spatial optical phase modulator 13 converts the right circularly polarized light L3 into the right circularly polarized light L4, the spatial optical phase modulator 13 can modulate a phase of the right circularly polarized light L3 in accordance with a predetermined phase-modulation amount for each microcell C. In addition, when the spatial optical phase modulator 13 converts the left circularly polarized light L5 into the left circularly polarized light L6, the spatial optical phase modulator 13 can modulate a phase of the left circularly polarized light L5 in accordance with a predetermined phase-modulation amount for each microcell C. In the spatial optical phase modulator 13, a magnetization free layer included in each of the microcells C is configured such that a magnetization direction of the magnetization free layer is parallel or substantially parallel to a propagation direction of light propagating inside the microcell C. Therefore, the phase-modulation amount for the right circularly polarized light L3 and the phase-modulation amount for the left circularly polarized light L5 are added to each other. Thus, the optical computing device 1 which uses the spatial optical phase modulator 13 as a reflection type makes it possible to provide a phase-modulation amount which is twice as large as that obtained in a case where the spatial optical phase modulator 13 is used as a transmission type.

Note that the phase-modulation amount of each of the microcells C of the spatial optical phase modulator 13 is predetermined so as to perform desired optical computing. The phase-modulation amount of each microcell C can be set, for example, through machine learning. In this machine learning, it is possible to use, for example, a model into which a two-dimensional intensity distribution of the right circularly polarized light L3 that enters the other main surface of the substrate 131 is inputted, from which a two-dimensional intensity distribution of the left circularly polarized light L6 that is the left circularly polarized light having been reflected on the reflection surface of the mirror 14 described later and that exits from the other main surface of the substrate 131 is outputted, and which includes a phase-modulation amount of each of the microcells C as a parameter.

Specific Example

With reference to FIG. 2, the following description will discuss a specific example of the spatial optical phase modulator 13. (a) of FIG. 2 is a plan view of the spatial optical phase modulator 13 in accordance with the present specific example. (b) of FIG. 2 is a cross-sectional view illustrating a microcell C constituting the spatial optical phase modulator 13 in accordance with the present specific example.

As illustrated in (a) of FIG. 2, the spatial optical phase modulator 13 includes a plurality of microcells C having phase-modulation amounts that are independently set. When signal light beams (in one or more embodiments, the right circularly polarized light L3 or the left circularly polarized light L5) enter the spatial optical phase modulator 13, the signal light beams are phase-modulated by the microcells C and then interfere with each other. Consequently, predetermined optical computing is carried out. The phase-modulation amounts of the microcells C may be variable or may be fixed. In the present specific example, the phase-modulation amounts are variable.

In the present specification, the "microcell" means a cell having a cell size of less than 10 μm, for example. Further, the "cell size" means a square root of an area of a cell. For example, given that the microcell C is in the form of a square in a plan view, a cell size of the microcell C means a length of one side of the microcell C. A lower limit of the cell size of the microcell C is 1 nm, for example.

The spatial optical phase modulator 13 shown in (a) of FIG. 2 as an example is constituted by 200×200 microcells C arranged in a matrix. A shape of each microcell C in a plan view is a square of 500 nm×500 nm. A shape of the spatial optical phase modulator 13 in a plan view is a square of 100 μm×100 μm.

For example, as illustrated in (b) of FIG. 2, the microcells C constituting the spatial optical phase modulator 13 include respective magnetization free layers C11 and respective electrodes C12.

Each of the magnetization free layers C11 is a rectangular parallelepiped-shaped columnar member formed so as to stand on the one main surface of the substrate 131. In one or more embodiments, a pair of bottom surfaces C111 and C112 facing each other among the six surfaces constituting the magnetization free layer C11 each have a shape of a square of 500 nm×500 nm, as described above. Note that the bottom surfaces C111 and C112 of the magnetization free layer C11 refer to the surfaces parallel to the main surfaces of the substrate 131 among the six surfaces constituting the magnetization free layer C11.

Each of the bottom surface C111 and the bottom surface C112 is a surface that transmits light in the magnetization free layer C11 and is one example of an optically effective surface. In the present specific example, the right circularly polarized light L3, which is signal light going forward, enters the bottom surface C111, and the left circularly polarized light L5, which is signal light going back, enters the bottom surface C112. Thus, the bottom surface C111 is an optically effective surface through which signal light first enters the magnetization free layer C11. Therefore, the bottom surface C111 is one example of a first optically effective surface, and the bottom surface C112 is one example of a second optically effective surface.

(b) of FIG. 2 indicates, as an arrow kf, a propagation direction of the right circularly polarized light L3, which is signal light going forward and indicates, as an arrow kr, a propagation direction of the left circularly polarized light L5, which is signal light going back. The arrow kf indicates a direction from the bottom surface C111 toward the bottom surface C112, that is, in a state illustrated in (b) of FIG. 2, a direction from a right side of the magnetization free layer C11 toward a left side of the magnetization free layer C11. The arrow kr indicates a direction from the bottom surface C112 toward the bottom surface C111, that is, in a state illustrated in (b) of FIG. 2, a direction from a left side of the magnetization free layer C11 toward a right side of the magnetization free layer C11.

Each of the magnetization free layers C11 is made of a soft magnetic material having electric conductivity and light transmissivity (for example, CoFeB). Note, however, that the soft magnetic material of which the magnetization free layer C11 is made is not limited to the CoFeB. Examples of another soft magnetic material of which the magnetization free layer C11 is made include, as in the case of a spin orbit torque (SOT)-MRAM, an yttrium iron garnet (YIG), which is a magnetic garnet, and a substituted magnetic garnet in which part of yttrium of the YIG is substituted for Bi or Ce, for example.

Each of the electrodes C12 is an electrically conductive film formed on one of the four side surfaces among the six surfaces constituting the magnetization free layer C11, excluding the pair of bottom surfaces described above. That is, the electrode C12 is formed in a state of being in a direct contact with one side surface of the magnetization free layer C11. In a state illustrated in (b) of FIG. 2, the electrode C12 is formed on a side surface located on a lower side of the magnetization free layer C11. In the present specific example, the electrode C12 is a single electrode.

In one or more embodiments, a control part (conductor) formed may be, for example, in a direct contact with the magnetization free layer, like the electrode C12 (see (b) of FIG. 2) or may be, for example, in an indirect contact with the magnetization free layer via another material, like an electrode Cb12 (see FIG. 4) described later. Note, however, that even in a case of the latter, in order to control a direction of magnetization of the magnetization free layer, the control part is configured to be able to inject a current or a spin current into the magnetization free layer or be able to apply an external magnetic field to the magnetization free layer.

An electrical conductor of which the electrode C12 is made preferably contains heavy metal. Examples of the heavy metal include palladium (Pd), platinum (Pt), tantalum (Ta), and tungsten (W). The electrode C12 may be made of one heavy metal of these heavy metals or may be made of an alloy of a plurality of heavy metals of these heavy metals. Alternatively, the electrode C12 may be made of an alloy of at least one of these heavy metals and transition metal. Examples of the transition metal include iron (Fe), cobalt (Co), and copper (Cu). The electrode C12 may be constituted by a multilayer film including a layer made of at least one of the above-described heavy metals and a layer made of at least one of the above-described transition metals.

In addition, the optical computing device 1 includes a power source PS connected with the electrode C12 of each of the microcells C (see (b) of FIG. 2). The power source PS is configured to generate a pulse voltage or a pulse current. In one or more embodiments, the power source PS is configured to supply a pulse voltage. Here, the pulse voltage refers to a voltage having a waveform in which the voltage exceeds a predetermined voltage only for an extremely short period of time in a case where time is represented in a horizontal axis and voltage is represented in a vertical axis. The pulse current refers to a current having a waveform in which the current exceeds a predetermined current only for an extremely short period of time in a case where time is represented in a horizontal axis and current is represented in a vertical axis. The pulse voltage or the pulse current generated by the power source PS connected with the electrode C12 may be a continuous pulse or a single pulse.

When the pulse voltage or the pulse current is applied to the electrode C12, a spin current, which is a flow of spin-polarized electrons, is injected from the electrode C12 into the magnetization free layer C11, as in the case of a SOT-MRAM. As such, the electrode C12 is an electrode that injects a spin current into the magnetization free layer C11. In the present specific example, a polarization direction of the spin current injected into the magnetization free layer C11 is a direction parallel or substantially parallel to normal directions of the bottom surfaces C111 and C112 and, a direction of the spin current is a direction from the bottom surface C111 toward the bottom surface C112.

The magnetization free layer C11 is magnetized so as to be aligned with the polarization direction of the spin current injected. (b) of FIG. 2 indicates, as an arrow M11, a direction of magnetization of the magnetization free layer C11.

As such, in the present specific example, each of the magnetization free layers C11 is configured such that a direction of magnetization that occurs when the spin current is injected from the electrode C12 into the magnetization free layer C11 is parallel or substantially parallel to the normal directions of the bottom surface C111 and the bottom surface C112. Specifically, the propagation direction (see the arrow kf) of the right circularly polarized light L3, which is signal light going forward and the direction of the magnetization (see the arrow M11) of the magnetization free layer C11 are parallel or substantially parallel to each other and are the same direction. In addition, the propagation direction (see the arrow kr) of the left circularly polarized light L5, which is signal light going back and the direction of the magnetization (see the arrow M11) of the magnetization free layer C11 are parallel or substantially parallel to each other and are opposite directions. As described above, the electrode C12 is an aspect of a control part configured to inject a spin current into the magnetization free layer C11 to control a direction of magnetization of the magnetization free layer C11.

Therefore, in a case where the right circularly polarized light L3 is selected as signal light propagating in the microcells C in a direction of the arrow kf, a phase of the right circularly polarized light L3 is changed to either a delay or advance direction depending on a magnitude of the magnetization of the magnetization free layer C11. The present specific example assumes that the phase of the right circularly polarized light L3 delays. Further, in a case where the left circularly polarized light L5 is selected as signal light propagating in the microcells C in a direction of the arrow kr, the phase of the left circularly polarized light L5 is changed to either a delay or advance direction depending on a magnitude of the magnetization of the magnetization free layer C11. The present specific example assumes that the phase of the left circularly polarized light L5 delays. As such, in the present specific example, with respect to both the right circularly polarized light L3 and the left circularly polarized light L5, it is possible to control the phase-modulation amounts in accordance with a magnitude of the magnetization of the magnetization free layer C11.

The magnitude of the magnetization of the magnetization free layer C11 is determined in accordance with a magnitude of the spin current injected into the magnetization free layer C11. In addition, a magnitude of the spin current injected into the magnetization free layer C11 is determined in accordance with a magnitude of the pulse voltage or the pulse current supplied from the power source PS to the electrode C12. Therefore, controlling a magnitude of the pulse voltage or the pulse current supplied from the power source PS to the electrode C12 enables the phase-modulation amounts of the microcells C to be controlled. As such, each of the microcells C of the spatial optical phase modulator 13 of the present specific example is constituted by a spin injection-type optical phase modulator.

In the signal light propagating in the magnetization free layer, right circularly polarized light and left circularly polarized light have different refractive indices, and thus a phase difference occurs between the right circularly polarized light and the left circularly polarized light due to the magnetization of the magnetization free layer. The phase difference occurring between the right circularly polarized light and the left circularly polarized light is known as the Faraday effect.

In the microcells C of the present specific example, a liquid crystal is not used unlike an LCOS, and a mirror that moves mechanically is not used unlike a DMD. An LCOS and a DMD need to have a certain degree of size for smooth operation because the operating principles thereof are based on bulk properties. When the structures are smaller, the influence of, for example, intermolecular force from the wall surface is stronger, especially at the nano-size level. This causes the original operability to be lost.

In each of the microcells C of the present specific example, an optical phase modulator configured as in the case of the SOT-MRAM is employed as a configuration for injecting a spin current into the magnetization free layer. The magnetization of the magnetization free layer due to spin injection is a phenomenon that occurs in a nanoscale space. Therefore, a device that, like the present specific example, uses magnetization due to spin injection tends to be closer to an original high-speed operation when a size of each microcell is smaller. Thus, like an MRAM, the present specific example is capable of being made compact and operating at high speed.

Therefore, the present specific example makes it possible to provide an optical phase modulator capable of being made compact and operating at high speed.

A magneto-optical effect available for modulating a phase of signal light is, for example, the Cotton-Mouton effect, as well as the Faraday effect used for the spatial optical phase modulator 13. Note, however, that in a case where a thickness (a length along a propagation direction of signal light) of each magnetization free layer C11 and a magnitude of magnetization of each magnetization free layer C11 are standardized, a phase-modulation amount caused through the Faraday effect exceeds a phase-modulation amount caused through the Cotton-Mouton effect. Therefore, in a case where the thickness of each magnetization free layer C11 and the magnitude of the magnetization of each magnetization free layer C11 are standardized, the spatial optical phase modulator 13 can yield a larger maximum value of a phase-modulation amount that can be provided to signal light than a spatial optical phase modulator using the Cotton-Mouton effect. In a case where it is only necessary to provide signal light with the same phase-modulation amount as that of the spatial optical phase modulator using the Cotton-Mouton effect, it is possible to cause the thickness of each of the magnetization free layers C11 to be smaller than that of the spatial optical phase modulator using the Cotton-Mouton effect. Decreasing the thickness of each magnetization free layer C11 has effects of, for example, making it easier to shape the microcells C, enabling the distribution of magnetization in each magnetization free layer C11 to be almost uniform, and enabling signal light to be prevented from being absorbed in the magnetization free layer C11.

Note that as a structure for applying the pulse voltage or the pulse current to each of the microcells C, it is possible to use a matrix structure employed in order to drive pixels in a liquid crystal display or an organic EL display, for example. Here, the matrix structure used in the spatial optical phase modulator 13 may be a simple matrix structure or may be an active matrix structure.

In order to apply a pulse voltage or a pulse current to each of the microcells C, the simple matrix structure includes a first signal line group in which signal lines extend in a first direction and a second signal line group in which signal lines extend in a second direction. The first direction and the second direction intersect. In the plan view of the spatial optical phase modulator 13 illustrated in (a) of FIG. 2, in a case where a direction along an up-and-down direction on the drawing corresponds to a first direction, a direction along a left-and-right direction on the drawing is a second direction. It is possible that both of the first signal line group and the second signal line group are provided on one main surface of the substrate 131. It is also possible that one of them (for example, the first signal line group) is provided on one main surface of the substrate 131 and the other of them (for example, the second signal line group) is provided on one main surface of a substrate different from the substrate 131. Examples of the one main surface of the different substrate include the reflection surface 141 of the mirror 14 described later.

In order to apply a pulse voltage or a pulse current to each of the microcells C, the active matrix structure includes a first signal line group in which signal lines extend in a first direction, a second signal line group in which signal lines extend in a second direction, active elements (also referred to as "switching elements"), and a common electrode. Also in the active matrix structure, the first direction and the second direction intersect, as in the case of the simple matrix structure. In the active matrix structure, the first signal line group and the second signal line group are both provided on one main surface of the substrate 131. In addition, the common electrode is provided on one main surface of a substrate different from the substrate 131 (for example, on the reflection surface 141 of the mirror 14) so as to face the first signal line group and the second signal line group. The active elements are connected to intersections between signal lines constituting the first signal line group and signal lines constituting the second signal line group, and a cell group C is interposed between the active elements and the common electrode.

<Mirror>

The mirror 14 includes a reflection surface 141 that regularly reflects light which has entered the reflection surface 141. In one or more embodiments, the reflection surface 141 is obtained by using a plate member made of glass as a base material and forming a metal film on one main surface of the plate member. Note, however, that the configuration of the mirror 14 is not limited to this and can be selected as appropriate.

The mirror 14 is arranged such that the reflection surface 141 faces and is parallel or substantially parallel to the bottom surface C112 of each of the microcells C of the spatial optical phase modulator 13.

In a case where the right circularly polarized light L4 is reflected on the reflection surface 141, a rotation direction of the circularly polarized light is maintained, whereas a propagation direction of the light is reversed. Therefore, the mirror 14 converts the right circularly polarized light L4 through reflection on the reflection surface 141 into the left circularly polarized light L5.

Note that in one or more embodiments, each microcell C of the spatial optical phase modulator 13 and the reflection surface 141 of the mirror 14 are spaced from each other, as illustrated in FIG. 1 and (b) of FIG. 2. Note, however, that the microcells C and the reflection surface 141 may be in contact with each other.

First Variation of Microcell

Figure 3:
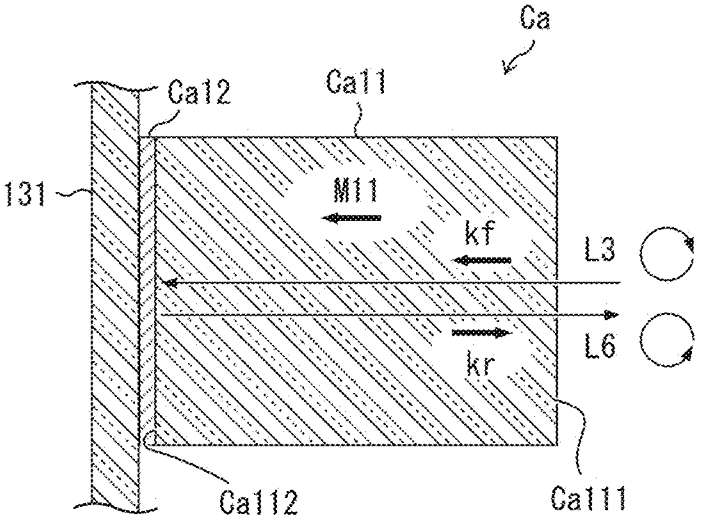
FIG. 3 is a cross-sectional view illustrating a first variation of the microcell illustrated in (b) of FIG. 2.

With reference to FIG. 3, the following description will describe microcells Ca each of which is a first variation of the microcell C (see (b) of FIG. 2). FIG. 3 is a cross-sectional view of the microcell Ca.

As illustrated in FIG. 3, each of the microcells Ca includes a magnetization free layer Ca11 and an electrode Ca12.

The magnetization free layer Ca11 is configured as in the case of the magnetization free layer C11 of the microcell C. Note, however, that the magnetization free layer Ca11 differs from the magnetization free layer C11 in that the magnetization free layer Ca11 is formed so as to stand on a surface of the electrode Ca12 stacked on one main surface of the substrate 131, instead of being formed so as to stand directly on one main surface of the substrate 131.

As in the case of the electrode C12 of the microcell C, the electrode Ca12 is a single electrode constituted by a conductor film. Note, however, that the electrode Ca12 differs from the electrode C12 in that the electrode Ca12 is formed on a bottom surface Ca112, instead of being formed on one of the four side surfaces among the six surfaces constituting the magnetization free layer Ca11, excluding the bottom surfaces Ca111 and Ca112. In other words, the electrode Ca12 is formed so as to be interposed between the bottom surface Ca112 of the magnetization free layer Ca11 and the one main surface of the substrate 131. That is, the electrode Ca12 is formed in a state of being in a direct contact in the bottom surface Ca112, which is one bottom surface of the magnetization free layer Ca11.

As such, in each of the microcell Ca, the bottom surface Ca112 is covered with the electrode Ca12, and thus the bottom surface Ca112 of the magnetization free layer Ca11 reflects light. That is, the bottom surface Ca112 reflects light. Therefore, in the microcell Ca, the bottom surface Ca111 forming a tip end surface of the microcell Ca is used as a first optically effective surface and allows the right circularly polarized light L3, which is signal light going forward, to enter the bottom surface Ca111.

The right circularly polarized light L3 that has entered the magnetization free layer Ca11 propagates inside the magnetization free layer Ca11 in a direction of the arrow kf (in a state illustrated in FIG. 3, a direction from a right side toward a left side), as in the case of the microcell C.

The right circularly polarized light L3 that has propagated to the bottom surface Ca112 is reflected on the surface of the electrode Ca12 to be converted into the left circularly polarized light L6, which is signal light going back. Therefore, the surface of the electrode Ca12 functions as a reflection surface. In other words, the electrode Ca12 has a function of the mirror 14 in the microcell C, as well as a function as an electrode.

The left circularly polarized light L6 that has been reflected by the electrode Ca12 propagates inside the magnetization free layer Ca11 in a direction of the arrow kr (a direction from a left side toward a right side in a state illustrated in FIG. 3) and exits from the bottom surface Ca111 to an outside of the microcells Ca, as in the case of the microcell C.

Note that although not illustrated in FIG. 3, the power source PS configured to generate the pulse voltage or the pulse current is connected to the electrode Ca12, as in the case of the electrode C12.

Also, in each of the microcells Ca, when the pulse voltage or the pulse current is applied to the electrode Ca12, a spin current, which is a flow of spin-polarized electrons, is injected from the electrode Ca12 into the magnetization free layer Ca11, as in the case of the SOT-MRAM. Here, a polarization direction of the spin current injected into the magnetization free layer Ca11 is a direction parallel or substantially parallel to normal directions of the bottom surfaces Ca111 and Ca112, and a direction of the spin current is a direction from the bottom surface Ca111 toward the bottom surface Ca112.

As described in the above section concerning the microcell C, the magnetization free layer C11 is magnetized so as to be aligned with the polarization direction of the spin current injected. Accordingly, also in the case of the microcell Ca, the magnetization free layer Ca11 is magnetized so as to be parallel or substantially parallel to normal directions of the bottom surface Ca111 and the bottom surface Ca112 (see the arrow M11 illustrated in FIG. 3), as in the case of the magnetization free layer C11 of the microcell C. Therefore, as in the case of the microcell C, each of the microcells Ca functions as a spin injection-type optical phase modulator. Further, the microcell Ca employs a configuration similar to the SOT-MRAM in order to inject a spin current into the magnetization free layer Ca11. In the microcell Ca, the electrode Ca12 is an aspect of a control part configured to control a direction of magnetization of the magnetization free layer Ca11.

Second Variation of Microcell

Figure 4:
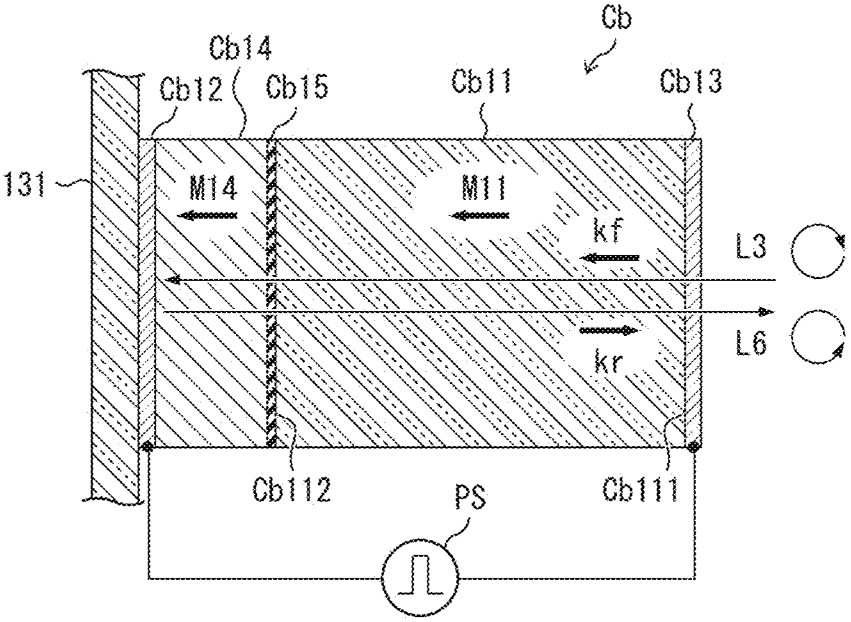
FIG. 4 is a cross-sectional view illustrating a second variation of the microcell illustrated in (b) of FIG. 2.

With reference to FIG. 4, the following description will describe a microcell Cb which is a second variation of the microcell C (see (b) of FIG. 2). FIG. 4 is a cross-sectional view illustrating the microcell Cb.

As illustrated in FIG. 4, each of the microcells Cb includes a magnetization free layer Cb11, an electrode Cb12, an electrode Cb13, a magnetization fixed layer Cb14, and an insulating layer Cb15.

The magnetization free layer Cb11 is configured as in the case of the magnetization free layer C11 of the microcell C. Note, however, that the magnetization free layer Cb11 differs from the magnetization free layer C11 in that the magnetization free layer Cb11 is, so as to stand, stacked onto the electrode Cb12, the magnetization fixed layer Cb14, and the insulating layer Cb15 which are stacked on one main surface of the substrate 131, instead of being formed so as to stand directly on one main surface of the substrate 131.

Note that in the magnetization free layer Cb11, a bottom surface Cb111 functions as a first optically effective surface and a bottom surface Cb112 functions as a second optically effective surface.

As in the case of the electrode C12 of the microcell C, the electrode Cb12 is an electrode constituted by a conductor film. Note, however, that the electrode Cb12 differs from the electrode C12 in that the electrode Cb12 is formed indirectly on the bottom surface Cb112 via the insulating layer Cb15 and the magnetization fixed layer Cb14, instead of being formed on one of the four side surfaces among the six surfaces constituting the magnetization free layer Cb11, excluding a pair of bottom surfaces Cb111 and Cb112. In other words, the electrode Cb12 is configured as in the case of the electrode Ca12 (see FIG. 3) of the microcell Ca. The electrode Cb12 is preferably made of metal having high conductivity, such as aluminum (Al) or copper (Cu). The electrode Cb12 is one example of a second electrode provided to the magnetization fixed layer Cb14 described later.

In the microcell Cb, in addition to the electrode Cb12, the magnetization fixed layer Cb14, the insulating layer Cb15, the magnetization free layer Cb11, and the electrode Cb13 are stacked on one main surface of the substrate 131 in this order.

The magnetization fixed layer Cb14 is made of, for example, a hard magnetic material having electric conductivity (for example, permalloy). Note that the magnetization fixed layer Cb14 is configured such that a direction of magnetization thereof (see the arrow M14 illustrated in FIG. 4) is parallel or substantially parallel to a normal direction of the bottom surface Cb111, which is a first optically effective surface, and a normal direction of the bottom surface Cb112, which is a second optically effective surface. FIG. 4 shows that a surface of the electrode Cb12 (an interface between the electrode Cb12 and the magnetization fixed layer Cb14) functions as a reflection surface for the right circularly polarized light L3. Note that material of which the magnetization fixed layer Cb14 is made has a certain reflectance for the right circularly polarized light L3 having a predetermined wavelength. Therefore, depending on the wavelength of the right circularly polarized light L3 and the reflectance of the magnetization fixed layer Cb14 for the wavelength, the right circularly polarized light L3 is reflected inside the magnetization fixed layer Cb14 or on the surface of the magnetization fixed layer Cb14 (an interface between the magnetization fixed layer Cb14 and the insulating layer Cb15), not only on the surface of the electrode Cb12. Selecting material of which the magnetization fixed layer Cb14 is made and a thickness of the magnetization fixed layer Cb14 as appropriate enables change in a position in which the right circularly polarized light L3 is reflected.

The insulating layer Cb15 is an insulating layer that, together with the magnetization fixed layer Cb14 and the magnetization free layer Cb11, constitutes a tunnel junction.

As in the case of the electrode Cb12, the electrode Cb13 is an electrode constituted by a conductor film. Note, however, that the electrode Cb13 faces the electrode Cb12 and is formed so as to sandwich, together with the electrode Cb12, the magnetization fixed layer Cb14, the insulating layer Cb15, and the magnetization free layer Cb11, and cover the bottom surface Cb111. That is, the electrode Cb13 is formed in a state of being in a direct contact with the bottom surface Cb111, which is one bottom surface of the magnetization free layer Cb11. The electrode Cb13 is made of transparent electrode material which transmits the right circularly polarized light L3 and the left circularly polarized light L6. As the transparent electrode material, for example, ITO, IGZO, ZnO, GZO (gallium-doped zinc oxide), silver nanowires, and carbon-nanotube thin films are suitable. The electrode Cb13 is one example of a first electrode provided to the magnetization free layer Cb11.

In addition, the power source PS is connected with the pair of the electrode Cb12 and the electrode Cb13 (see FIG. 4). When a potential difference is provided between the electrode Cb12 and the electrode Cb13 with use of a voltage generated by the power source PS, a spin current is injected through the tunnel effect from the magnetization fixed layer Cb14 into the magnetization free layer Cb11 via the insulating layer Cb15, resulting in magnetization occurring in the magnetization free layer Cb11 (see the arrow M11 illustrated in FIG. 4). Here, the magnetization occurring in the magnetization free layer Cb11 is magnetization parallel to the magnetization of the magnetization fixed layer Cb14 (see the arrow M14 illustrated in FIG. 4). That is, the magnetization free layer Cb11 is magnetized so as to be parallel or substantially parallel to normal directions of the bottom surface Cb111 and the bottom surface Cb112 of the magnetization free layer Cb11. Therefore, as in the case of the microcell C, each of the microcells Cb functions as a spin injection-type optical phase modulator. Further, the microcell Cb employs a configuration similar to the STT-MRAM in order to inject a spin current into the magnetization free layer Cb11. In the microcell Cb, the electrode Cb12 and the electrode Cb13 are each an aspect of a control part configured to control a direction of magnetization of the magnetization free layer Ca11. Note that in one or more embodiments, it is also possible that, like the electrode Cb12 and the electrode Cb13, one of two control parts (electrode Cb13) is formed so as to be in a direct contact with the magnetization free layer, and the other (electrode Cb12) is formed so as to be in an indirect contact with the magnetization free layer via another material.

Third Variation of Microcell

Figure 5:
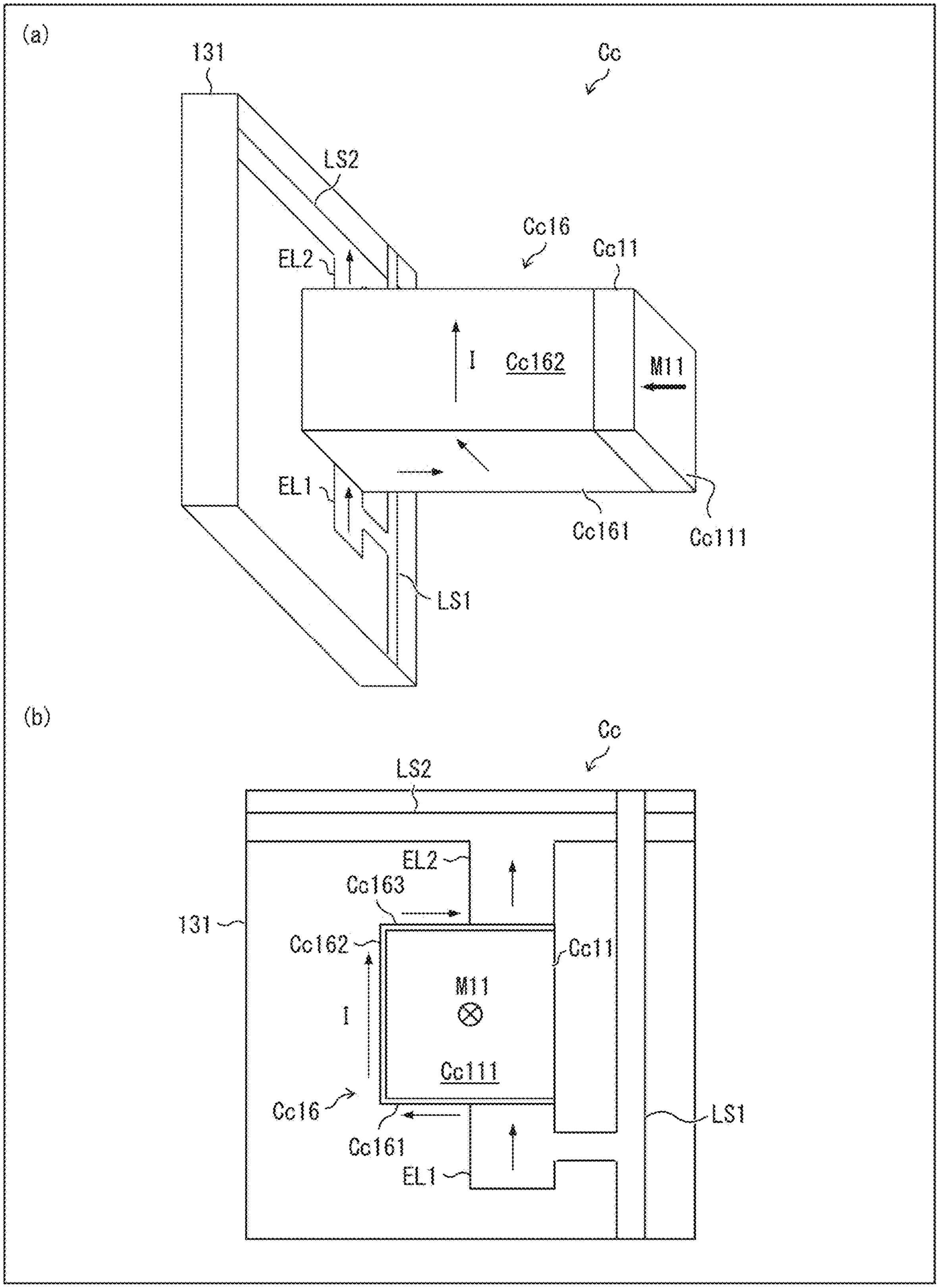
FIG. 5 is a perspective view illustrating a third variation of the microcell illustrated in (b) of FIG. 2 and a plan view illustrating the third variation.

With reference to FIG. 5, the following description will discuss microcells Cc each of which is a third variation of the microcell C (see (b) of FIG. 2). (a) of FIG. 5 is a perspective view illustrating the microcell Cc. (b) of FIG. 5 is a plan view illustrating the microcell Cc. Note that the plan view illustrated in (b) of FIG. 5 shows a bottom surface Cc111 of a magnetization free layer Cc11 which constitutes the microcell Cc as viewed from a normal direction of the bottom surface Cc111 (a right direction in (a) of FIG. 5).

As illustrated in (a) and (b) of FIG. 5, each of the microcells Cc includes a magnetization free layer Cc11 and a conductor pattern Cc16.

The magnetization free layer Cc11 is configured as in the case of the magnetization free layer C11 of the microcell C. That is, the magnetization free layer Cc11 is formed so as to stand directly on one main surface of the substrate 131.

The conductor pattern Cc16 is a conductor film formed over three side surfaces of the four side surfaces constituting the magnetization free layer Cc11 which is a rectangular parallelepiped-shaped columnar member. That is, the conductor pattern Cc16 is formed in a state of being in a direct contact with the three side surfaces of the magnetization free layer Cc11. In the conductor pattern Cc16 illustrated in (b) of FIG. 5, among the above three side surfaces, an area formed on a side surface located on a lower side is referred to as a "first area Cc161", an area formed on a side surface located on a left side is referred to as a "second area Cc162", and an area formed on a side surface located on an upper side is referred to as a "third area Cc163". The conductor pattern Cc16 is an aspect of a control part configured to control a direction of magnetization of the magnetization free layer Cc11.

The conductor of which the conductor pattern Cc16 is made is preferably metal and is more preferably metal having favorable conductivity. Examples of the metal having favorable conductivity include gold, copper, and aluminum.

In the present variation, part of a matrix structure formed on one main surface of the substrate 131 is illustrated. The matrix structure used in the present variation is a simple matrix structure. Note, however, that in the present variation, an active matrix structure can be used instead of the simple matrix structure.

(a) and (b) of FIG. 5 each illustrate a first signal line LS1 extending along a first direction (an up-and-down direction in (b) of FIG. 5) and a second signal line LS2 extending in a second direction (a left-and-right direction in (b) of FIG. 5). Note that the first signal line LS1 and the second signal line LS2 are formed on different layers, and an insulating layer is interposed between the layer in which the first signal line LS1 is formed and the layer in which the second signal line LS2 is formed. Therefore, in the plan view of (b) of FIG. 5, the first signal line LS1 and the second signal line LS2 intersect, but the first signal line LS1 and the second signal line LS2 are insulated from each other at the intersection.

In the conductor pattern Cc16, the first area Cc161 is electrically conductive with the first signal line LS1 via a first electrode pattern EL1, and the third area Cc163 is electrically conductive with the second signal line LS2 via a second electrode pattern EL2. Therefore, in a case where current I is caused to flow from the first signal line LS1 toward the second signal line LS2, the current I qualitatively flows as indicated by the arrows illustrated in (a) and (b) of FIG. 5. As a result, an external magnetic field caused by the current I flowing in the conductor pattern Cc16 is applied to the magnetization free layer Cc11, and the magnetization free layer Cc11 is magnetized. (a) and (b) of FIG. 5 each indicate, as the arrow M11, a direction of magnetization of the magnetization free layer Cc11. Note that a magnitude of the magnetization of the magnetization free layer Cc11 can be controlled with use of a direction and a magnitude of a current caused to flow in the conductor pattern Cc16.

As such, in the present variation, the magnetization free layer Cc11 is configured such that a direction of magnetization that occurs when the current I flows in the conductor pattern Cc16 is parallel or substantially parallel to normal directions of a pair of bottom surfaces (the bottom surface Cc111 and a bottom surface facing the bottom surface Cc111). Therefore, as in the case of the microcell C illustrated in (b) of FIG. 2, each of the microcells Cc makes it possible to control a phase-modulation amount of circularly polarized light in accordance with a magnitude of magnetization of the magnetization free layer Cc11.

As described above, in one or more embodiments, each of the microcells Cc includes: the magnetization free layer Cc11 having a pair of a first optically effective surface and a second optically effective surface that face each other (the bottom surface Cc111 and a bottom surface facing the bottom surface Cc111); and an electrode (the conductor pattern Cc16) configured to control a direction of magnetization of the magnetization free layer Cc11. In each of the microcells Cc, the magnetization free layer Cc11 and the control part (the conductor pattern Cc16) are each configured to control a direction of magnetization of the magnetization free layer Cc11 such that the direction of the magnetization is parallel or substantially parallel to normal directions of the first optically effective surface and the second optically effective surface (the bottom surface Cc111 and a bottom surface facing the bottom surface Cc111)

Note that in the present variation, the conductor pattern Cc16 which is continuous over three side surfaces of the four side surfaces constituting the magnetization free layer Cc11 is formed. However, the number of the side surfaces in which the conductor pattern Cc16 is formed is not limited to three, and may be two or may be four. In a case where the number of the side surfaces in which the conductor pattern Cc16 is formed is two, the two side surfaces may be two adjacent side surfaces or may be two side surfaces facing each other. In a case where the conductor patterns Cc16 are formed on two side surfaces facing each other, first and second signal lines may be connected with the respective conductor patterns. In a case where the number of the side surfaces in which the conductor pattern Cc16 is formed is four, it is only required that one end part of the conductor pattern Cc16 (an end part on a side connected with the first electrode pattern EL1) and the other end part (an end part on a side connected with the second electrode pattern EL2) are spaced from each other so as to prevent the conductor pattern Cc16 from constituting a closed loop around the magnetization free layer Cc11.

Fourth Variation of Microcell

Figure 6:
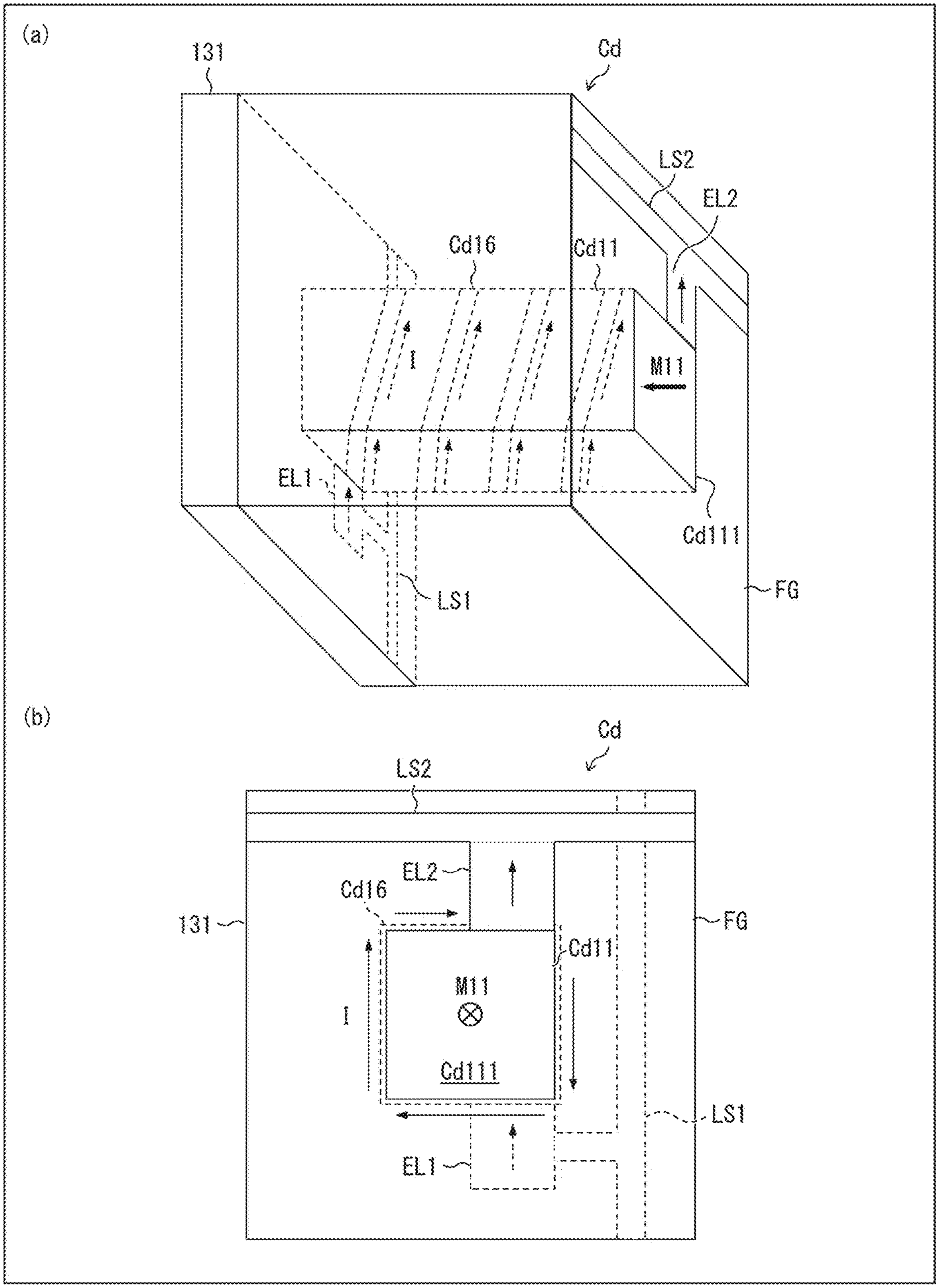
FIG. 6 shows a perspective view illustrating a fourth variation of the microcell illustrated in (b) of FIG. 2 and a plan view illustrating the fourth variation.

With reference to FIG. 6, the following description will discuss microcells Cd each of which is a fourth variation of the microcell C (see (b) of FIG. 2). (a) of FIG. 6 is a perspective view illustrating the microcell Cd. (b) of FIG. 6 is a plan view illustrating the microcell Cd. Note that the plan view illustrated in (b) of FIG. 6 shows a bottom surface Cd111 of a magnetization free layer Cd11 which constitutes the microcell Cd as viewed from a normal direction of the bottom surface Cd111 (a right direction in (a) of FIG. 6).

It can be also said that the microcell Cd is one variation of the microcell Cc. In the present variation, the following description will discuss the configuration of the microcell Cd on the basis of the microcell Cc. As illustrated in (a) and (b) of FIG. 6, each of the microcells Cd includes a magnetization free layer Cd11, a conductor pattern Cd16, and a gap filler FG.

The magnetization free layer Cd11 is configured as in the case of the magnetization free layer Cc11 of the microcell Cc. Further, the bottom surface Cd111 corresponds to the bottom surface Cc111 in the magnetization free layer Cc11. Therefore, in the present variation, the magnetization free layer Cd11 is not described.

The conductor pattern Cd16 corresponds to the conductor pattern Cc16 of the microcell Cc and is an aspect of a control part configured to control a direction of magnetization of the magnetization free layer Cd11. The conductor pattern Cd16 is obtained by forming a strip-shaped conductor film on the four side surfaces of the magnetization free layer Cd11 so as to be in a helical shape, as illustrated in (a) of FIG. 6. That is, the conductor pattern Cd16 is formed in a state of being in a direct contact with the four side surfaces of the magnetization free layer Cd11. It can be also said that the conductor pattern Cd16 is a kind of a solenoid coil.

In the present variation, one end part of the conductor pattern Cd16 is located on a root side of the magnetization free layer Cd11 (on a left side in a state illustrated in (a) of FIG. 6), and the other end part of the conductor pattern Cd16 is located on a tip side of the magnetization free layer Cd11 (on a right side in a state illustrated in (a) of FIG. 6). Therefore, the conductor pattern Cd16 has, between one end part and the other end part thereof, a gap corresponding to a height of the magnetization free layer Cd11 (an interval between the bottom surface Cd111 and a bottom surface facing the bottom surface Cd111).

Thus, in the present variation, the first signal line group (the first signal line LS1 in (a) of FIG. 6) among the first signal line group and the second signal line group is formed on one main surface of the substrate 131, and then the gap filler FG having the same thickness as the height of the magnetization free layer Cd11 is formed on the one main surface of the substrate 131, followed by forming the second signal line group (the second signal line LS2 in (a) of FIG. 6) on a surface of the gap filler FG.

Material of the gap filler FG is not limited and can be selected as appropriate from among existing materials. Examples of the material of the gap filler FG include spin-on-glass (SOG) and polymer.

In each of the microcells Cd, the conductor pattern Cd16 functions as a solenoid coil. Therefore, causing the current I to flow from the first signal line LS1 toward the second signal line LS2 enables an external magnetic field caused by the current I flowing in the conductor pattern Cd16, as illustrated in (a) and (b) of FIG. 6, to be applied to the magnetization free layer Cd11. Therefore, as in the case of the microcell C illustrated in (b) of FIG. 2, each of the microcells Cd makes it possible to control a phase-modulation amount of circularly polarized light in accordance with a magnitude of magnetization of the magnetization free layer Cd11.

Variation of Optical Computing Device

Figure 7:
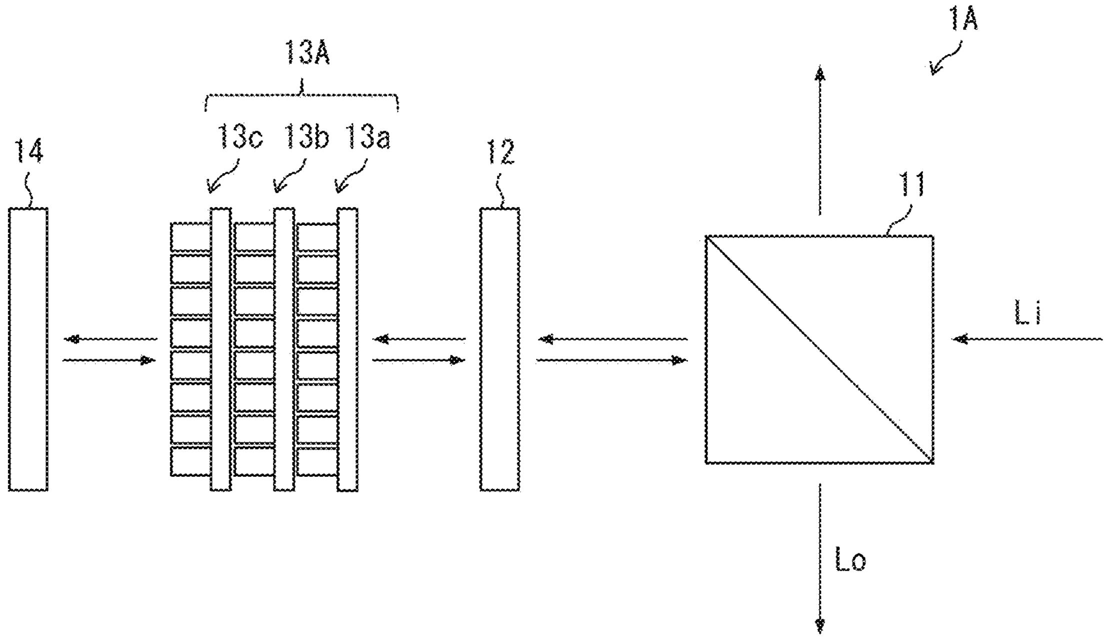
FIG. 7 is a view schematically illustrating a configuration of one variation of an optical computing device in accordance with one or more embodiments.

With reference to FIG. 7, the following description will discuss an optical computing device 1A which is one variation of the optical computing device 1. FIG. 7 is a view schematically illustrating a configuration of the optical computing device 1A.

The optical computing device 1A is configured as in the case of the optical computing device 1. Note, however, that the optical computing device 1A includes a spatial optical phase modulator group 13A including three spatial optical phase modulators 13*a*, 13*b*, and 13*c*, whereas the optical computing device 1 includes the single spatial optical phase modulator 13. Therefore, in the present variation, the spatial optical phase modulator group 13A will be described, and the other components are not described.

Each of the spatial optical phase modulators 13*a*, 13*b*, and 13*c* is configured as in the case of the spatial optical phase modulator 13 in the optical computing device 1. The spatial optical phase modulators 13*a*, 13*b*, and 13*c* are arranged in a state of being sequentially stacked between the quarter wave plate 12 and the mirror 14 and on a light path of signal light.

According to the above configuration, the spatial optical phase modulators 13*a*, 13*b*, and 13*c* act on the signal light going forward from the quarter wave plate 12 toward the mirror 14 in the order of the spatial optical phase modulators 13*a*, 13*b*, 13*c*. In addition, the spatial optical phase modulators 13*a*, 13*b*, and 13*c* act on the signal light which has been reflected by the mirror 14 and is going back from the mirror 14 toward the quarter wave plate 12 in the order of the spatial optical phase modulators 13*c*, 13*b*, 13*a*.

The spatial optical phase modulators 13*a*, 13*b*, and 13*c* configured as above make it possible to perform optical computing in a plurality of stages with respect to the signal light Li inputted into the optical computing device 1.

Note that in the present variation, adjacent spatial optical phase modulators of the spatial optical phase modulators 13*a*, 13*b*, and 13*c* are in contact with each other. Therefore, an interval between adjacent magnetization free layers C11 (for example, an interval between the bottom surface C112 of the spatial optical phase modulator 13*a* and the bottom surface C111 of the spatial optical phase modulator 13*b*) is defined by a thickness of the substrate 131. The thickness of the substrate 131 which defines the interval of the magnetization free layers C11 is not particularly limited and can be set as appropriate. Alternatively, adjacent spatial optical phase modulators of the spatial optical phase modulators 13*a*, 13*b*, and 13*c* may be spaced from each other at a predetermined interval. In this way, in the optical computing device 1A, the interval between the magnetization free layers C11 and the interval between the spatial optical phase modulators 13 can be adjusted in accordance with, for example, a design of the optical computing device 1A and a task to be performed by the optical computing device 1A.

Aspects of one or more embodiments can also be expressed as follows:

A spatial optical phase modulator in accordance with Aspect 1 of one or more embodiments is a spatial optical phase modulator including a plurality of microcells. In the present spatial optical phase modulator, each of the plurality of microcells is constituted by an optical phase modulator (each of the microcells) including: a magnetization free layer having a first optically effective surface and a second optically effective surface that face each other; and a control part configured to control a direction of magnetization of the magnetization free layer, and the magnetization free layer and the control part are configured to control the direction of the magnetization such that the direction of the magnetization is parallel or substantially parallel to normal directions of the first optically effective surface and the second optically effective surface.

According to the above configuration, it is possible to provide a spatial optical phase modulator capable of being made compact and operating at high speed.

In addition, in a spatial optical phase modulator in accordance with Aspect 2 of one or more embodiments, in addition to the configuration of the spatial optical phase modulator in accordance with Aspect 1 above, the control part is an electrode configured to inject a spin current into the magnetization free layer, and the magnetization free layer is configured such that a direction of magnetization that occurs when the spin current is injected from the electrode into the magnetization free layer is parallel or substantially parallel to the normal directions of the first optically effective surface and the second optically effective surface.

The spatial optical phase modulator in accordance with Aspect 2 of one or more embodiments can be also expressed as follows. That is, the spatial optical phase modulator in accordance with Aspect 2 of one or more embodiments is a spatial optical phase modulator including a plurality of microcells two-dimensionally arranged, wherein: each of the plurality of microcells is constituted by a spin injection-type optical phase modulator including a magnetization free layer and an electrode (one or more electrodes) configured to inject a spin current into the magnetization free layer; and the magnetization free layer has a first optically effective surface and a second optically effective surface that face each other and is configured such that a direction of magnetization that occurs when the spin current is injected from the electrode into the magnetization free layer is parallel or substantially parallel to normal directions of the first optically effective surface and the second optically effective surface.

In each of the microcells of the present spatial optical phase modulator, an optical phase modulator configured as in the case of the spin transfer torque (STT)-magnetoresistive random access memory (MRAM) or the spin orbit torque (SOT)-MRAM is employed as a configuration for injecting the spin current into the magnetization free layer. The magnetization of the magnetization free layer caused by spin injection is a phenomenon that occurs in a nanoscale space. Therefore, a device that uses magnetization caused by spin injection tends to be closer to an original high-speed operation when a size of each microcell is smaller. Therefore, the present spatial optical phase modulator is capable of being made compact and operating at high speed, as in the case of the MRAM.

The magnetization free layer is magnetized so as to be parallel or substantially parallel to the normal directions of the first optically effective surface and the second optically effective surface due to the spin current, which is a flow of spin-polarized electrons. In each of the microcells, the signal light propagates inside the magnetization free layer along the normal directions of the first optically effective surface and the second optically effective surface. Therefore, in each of the microcells, the propagation direction of the signal light is parallel or substantially parallel to the magnetization direction in the magnetization free layer. Therefore, in each of the microcells, it is possible to control a phase-modulation amount of each of the microcells with use of a magnitude of the spin current injected into the magnetization free layer of the microcell.

Therefore, the present spatial optical phase modulator configured as above makes it possible to provide an optical phase modulator capable of being made compact and operating at high speed.

In addition, in a spatial optical phase modulator in accordance with Aspect 3 of one or more embodiments, in addition to the configuration of the spatial optical phase modulator Aspect 2 above, a configuration is employed in which the first optically effective surface is an optically effective surface through which signal light first enters the magnetization free layer, and the spatial optical phase modulator further comprises a mirror which is provided on a second optically effective surface side of the magnetization free layer and which has a reflection surface parallel or substantially parallel to the second optically effective surface.

According to the above configuration, each of the optical phase modulators of the spatial optical phase modulator is a reflection-type optical phase modulator in which signal light that has entered the optical phase modulator through the first optically effective surface is reflected by the mirror, and the signal light reflected exits from the first optically effective surface. A reflection-type optical phase modulator enables a light path of signal light to be twice as large as that of a transmission-type optical phase modulator. Therefore, a reflection-type optical phase modulator enables a controllable range of a phase-modulation amount to be greater than that of a transmission-type optical phase modulator. Note that a transmission-type optical phase modulator refers to an optical phase modulator which includes no mirror and in which signal light that has entered the optical phase modulator through the first optically effective surface exits from the second optically effective surface.

In addition, in a spatial optical phase modulator in accordance with Aspect 4 of one or more embodiments, in addition to the configuration of the spatial optical phase modulator in accordance with Aspect 3 above, a configuration is employed of further including a quarter wave plate which is provided on a first optically effective surface side of the magnetization free layer and which has a main surface parallel or substantially parallel to the first optically effective surface.

According to the above configuration, since the quarter wave plate converts linearly polarized light into right circularly polarized light or left circularly polarized light, it is possible to use linearly polarized light as signal light caused to enter the spatial optical phase modulator.

In a spatial optical phase modulator in accordance with Aspect 5 of one or more embodiments, in addition to the configuration of the spatial optical phase modulator in accordance with any one of Aspects 2 to 4 above, a configuration is employed in which in each of the plurality of microcells, the electrode thereof is a single electrode made of material containing heavy metal.

According to the above configuration, in each of the microcells of the present spatial optical phase modulator, a configuration similar to the SOT-MRAM is employed as a configuration for injecting a spin current into the magnetization free layer. Therefore, the present spatial optical phase modulator makes it possible to operate at higher speed than a spatial optical phase modulator that employs a configuration similar to the STT-MRAM as a configuration for injecting a spin current into the magnetization free layer. According to the above configuration, it is possible to increase the conversion efficiency at which a current is converted into a spin current polarized according to one spin.

In addition, in a spatial optical phase modulator in accordance with Aspect 6 of one or more embodiments, in addition to the configuration of the spatial optical phase modulator in accordance with Aspect 5 above, a configuration is employed of further including a power source which is connected with the electrode and which is configured to generate a pulse voltage or a pulse current.

According to the above configuration, it is possible to further increase the conversion efficiency.

In a spatial optical phase modulator in accordance with Aspect 7 of one or more embodiments, in addition to the configuration of the spatial optical phase modulator in accordance with any one of Aspects 2 to 4, a configuration is employed in which each of the plurality of microcells further comprises a magnetization fixed layer, and in each of the plurality of microcells, the electrode thereof includes a first electrode provided to the magnetization free layer and a second electrode provided to the magnetization fixed layer.

According to the above configuration, in each of the microcells of the present spatial optical phase modulator, a configuration similar to the STT-MRAM is employed as a configuration for injecting a spin current into the magnetization free layer. Each of the microcells of the present spatial optical phase modulator has more options for material that can be used for electrode material than a spatial optical phase modulator that employs a configuration similar to the SOT-MRAM as a configuration for injecting a spin current into the magnetization free layer. Therefore, the present spatial optical phase modulator makes it possible to increase design flexibility of the electrode.

In addition, an optical computing device in accordance with Aspect 8 of one or more embodiments includes a plurality of the spatial optical phase modulators each in accordance with any one of Aspects 1 to 7 above. In the present optical computing device, the plurality of the spatial optical phase modulators are arranged so as to sequentially act on signal light.

According to the above configuration, each of the spatial optical phase modulators is capable of being made compact and operating at high speed, and thus it is possible to provide an optical computing device capable of being made compact and operating at high speed.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1, 1A Optical computing device
11 Polarization beam splitter
12 Quarter wave plate
13, 13*a*, 13*b*, 13*c* Spatial optical phase modulator
131 Substrate
13A Spatial optical phase modulator group
C, Ca, Cb, Cc, Cd Microcell
C11, Ca11, Cb11, Cc11, Cd11 Magnetization free layer
C111, Ca111, Cb111, Cc111, Cd111 Bottom surface
C112, Ca112, Cb112 Bottom surface
C12, Ca12, Cb12 Electrode (control part)
Cb13 Electrode
Cb14 Magnetization fixed layer
Cb15 Insulating layer
Cc16, Cd16 Conductor pattern (control part)
14 Mirror

The invention claimed is:

1. An optical computing device comprising:
a polarization separation element that transmits a single polarization component of two orthogonal polarization components of incident light;
a quarter wave plate having a fast axis and a slow axis orthogonal to the fast axis;
a mirror; and
a spatial optical phase modulator including microcells, wherein
the polarization separation element, the quarter wave plate, the spatial optical phase modulator, and the mirror are arranged in this order in a direction of incidence of light,
each of the microcells comprises:
a magnetization free layer having a first optically effective surface and a second optically effective surface opposite to the first optically effective surface; and
a conductor that controls a direction of magnetization of the magnetization free layer to be parallel or substantially parallel to normal directions of the first optically effective surface and the second optically effective surface,
signal light first enters the magnetization free layer through the first optically effective surface,
the quarter wave plate is disposed on a side of the first optically effective surface and has a main surface parallel or substantially parallel to the first optically effective surface,
the slow axis is disposed such that an angle between the slow axis and the single polarization component is 45°, and
the mirror is disposed on a side of the second optically effective surface and has a reflection surface parallel or substantially parallel to the second optically effective surface.

2. The optical computing device according to claim 1, wherein
the conductor:
includes one or more electrodes that inject a spin current into the magnetization free layer, and
controls the direction of magnetization by injecting the spin current from the one or more electrodes into the magnetization free layer.

3. The optical computing device according to claim 2, wherein in each of the microcells, the conductor consists of a single electrode containing heavy metal.

4. The optical computing device according to claim 3, further comprising:
a power source that is connected with the electrode and that generates a pulse voltage or a pulse current.

5. The optical computing device according to claim 2, wherein:
each of the microcells further comprises a magnetization fixed layer, and
in each of the microcells, the conductor includes a first electrode on the magnetization free layer and a second electrode on the magnetization fixed layer.

6. The optical computing device according to claim 1 further comprising:

one or more additional spatial optical phase modulators, wherein the spatial optical phase modulator and the one or more additional spatial optical phase modulators are disposed to sequentially act on the signal light.

* * * * *